Patented Apr. 13, 1954

2,675,407

UNITED STATES PATENT OFFICE 2,675,407

AIR OXIDATION OF CYCLOALKANES

S. George Gallo, Clark Township, Union County, and Charles E. Morrell, Westfield, N. J., assignors to Standard Oil Development Company, a corporation of Delaware No Drawing. Application April 10, 1952, Serial No. 281,676

3 Claims. (Cl. 260—533)

This invention relates to a novel process for oxidizing cycloalkanes with oxygen-containing gases.

Processes have been previously proposed for oxidation of cycloalkanes through the utilization of gaseous oxygen.

Air oxidation methods in general, however, suffer a limitation on the conversion level attainable before the reaction runs down. This effect is more noticeable if water of reaction is allowed to accumulate in the reaction zone. In cases where a solvent such as acetic acid is employed, the water of reaction causes a separate aqueous acid layer to form. In the absence of polar solvents, failure to remove water of reaction limits conversions to 25 to 30%, beyond which the reaction runs down. Both of these lower the conversion level attainable.

Water of reaction can be removed in part by chilling and trapping it out from effluent vapors and recycling hydrocarbon to the oxidizing zone. This device, however, is not completely effective, since appreciable quantities of water can always be found in the reactor mixture.

It has also been proposed to utilize various solvents for the hydrocarbons in the reaction such as acetic acid, carbon tetrachloride, and benzene, particularly acetic acid. The water evolved during the reaction drives the acetic acid into the aqueous layer which still forms and the conversion level suffers. In addition, this system presents difficulties as regards the recovery of the products and recycling of unreacted materials.

It has now been found that oxidizing cycloalkanes with oxygen-containing gases to oxy compounds, i. e., acids, ketones, and alcohols, in the presence of tertiary butyl alcohol overcomes these difficulties of the prior art. Higher conversions are obtained with considerably better and more uniform oxygen utilization. No aqueous phase separation takes place and with proper adjustment of solvent to hydrocarbon ratios all solids can be retained in solution at ambient temperatures.

Tertiary butyl alcohol apparently functions as an oxidation-resistant solvent for the cycloalkanes and for the quantities of water normally encountered. It is especially surprising to learn that specifically tertiary butyl alcohol does not inhibit the reaction, as is the case with many other alcohols. Tertiary butyl alcohol, therefore, combines the desirable characteristics of good resistance to oxidation, good solvent power for the cycloalkane, and oxidation products derived therefrom, and a directive influence on the reaction such as to improve selectivity to useful products.

In addition, it prevents layer formation, facilitates material handling, and greatly simplifies the necessary processing equipment. It is easily separable from the reaction mixture by distillation and is obtained in sufficiently anhydrous form that admixture with fresh cyclohexane is accomplished with no tendency to break into separate layers. A ternary azeotrope of cyclohexane, tertiary butyl alcohol, and water boiling at 64–65° C. permits rejection of the bulk of the reaction water, which breaks out as a separate phase containing approximately 80% water, leaving an organic layer with only 1.2% water. This upper layer can be recycled to the reaction system in a continuous manner following adjustment to the desired alcohol-cyclohexane ratio. If desired, the water can be further reduced in the recycle by the utilization of a soluble salt such as sodium chloride.

In this manner it is possible to oxidize saturated cyclic hydrocarbons containing at least 4 cyclic carbon atoms, such as cyclohexane, cyclopentane, cyclobutane and the like or homologs such as the methyl-, dimethyl-, ethyl- or like substituted cyclic hydrocarbons, with production of aliphatic dibasic acids such as glutaric, succinic or the corresponding dibasic acids. This process is particularly useful in the oxidation of cyclohexane because of the utility of the adipic acid, cyclohexanol, and cyclohexanone products.

The oxidation is carried out in the liquid phase at temperatures in the range of about 100°–200° C.

While the process is operable at ordinary pressures, elevated pressures ranging upwards from about 2 atmospheres to about 100 atmospheres can be used. Higher pressures, for example as much as 1000 atmospheres, may be used. The minimum pressure is that required to permit effecting the reaction in the liquid phase, by which is meant that the hydrocarbon is preferably oxidized in the liquid or dissolved state. Pressures in excess of this minimum may be used, however, since pressure has been found to favor the reaction rate.

Tertiary butyl alcohol is utilized in an amount of about 0.1 to 3 weight parts and preferably 1–3 parts/1 part charge. (Because of similar densities in the case of cyclohexane, the parts can be weight or volume.)

Catalysts may be employed, but their use is not critical. Conventional catalysts known in the art include the solid polyvalent metals having an atomic weight between about 50 and about 200. Such metals may be used in the finely divided state or as organic and inorganic salts or oxides including such specific metals as cerium, cobalt, copper, manganese, and uranium, with or without inorganic acids such as nitric, phosphoric and hydrochloric acids or mixtures of any two or more of these substances. As specific catalysts under the above description there may be employed vanadium, cerium and cobalt chlorides, manganese acetate alone or together with barium acetate, barium or cobalt permanganate, sodium cobaltinitrite or mixtures of two or more of such compounds. In addition to the oxidation catalysts, promoters such as the alkali and alkaline earth metals may also be employed, if desired, such, for example, as the barium, magnesium and potassium acetates, butyrates, propionates, and the like.

This invention will be better understood by reference to the following examples of the preparation of the indicated compounds according to the process of this invention.

*Example I.—Oxidation of cyclohexane in the absence of tertiary butyl alcohol*

To a 2½-liter stainless steel autoclave suitably valved and equipped with a reflux condenser was charged 736 grams of cyclohexane and 3.5 grams of an oxidation catalyst (cobalt napthenate).

At the conclusion of a two-hour reaction period following initiation of the reaction, the oxygen utilization level was found to be 42.5%. The oxygen utilization level fluctuated from a high of 43% to a low of 21% and averaged 35% for the two-hour reaction period. The average temperature during the reaction was 136° C. and the total weight of recovered liquid and solid products 716 grams, representing a net loss of 20 grams during the reaction.

*Example II.—Oxidation in the presence of tertiary butyl alcohol*

To the equipment described in Example I was charged 497 grams cyclohexane and 273 grams of tertiary butyl alcohol. At the conclusion of a two-hour reaction period following initiation of the reaction, the oxygen utilization level was 65%. The oxygen utilization level fluctuated from a high of 93% to a low of 61%, and averaged 76%. The average temperature during the two-hour period was comparable to that of Example I (137° C.). The total weight of liquid and solid product was 849 grams representing a net gain of 79 grams.

This example indicates how substantially increased oxygen utilization levels were obtained by the process of this invention as well as increased yields of products.

*Example III*

The following runs were made in the above-described equipment to further illustrate the results attainable with tertiary butyl alcohol solvent in this oxidation. The runs were made at a temperature ranging from 135°–149° C., 150 p. s. i. g., and air rate of approximately 300 v./v.liq./hr. No catalyst was employed, and the run was terminated voluntarily when oxygen utilization fell below 35%.

| Solvent | None | Tertiary Butyl Alcohol |
|---|---|---|
| Ratio cyclohexane/solvent | | 1/2 |
| Time, hours | 2.0 | 3.5 |
| Percent Conversion | 14 | 52 |
| Mole Percent Selectivity: | | |
| Adipic Acid | 26 | 33 |
| C$_6$ Neutrals | 18 | 25 |
| | 44 | 58 |

It is noted from these data that by using tertiary butyl alcohol as solvent the selectivity to useful products was improved while trebling the conversion.

Typical reaction products are worked up by topping to 84° C. overhead temperature to recover cyclohexane or cyclohexane-tertiary butyl alcohol mixture, saponifying and steam distilling the bottoms for recovery of neutral oxy compounds, acidifying and drying of the bottoms by entrainment with added benzene and methyl ethyl keytone, rejection of inorganic salts by filtration, evaporation of the filtrate and acetone washes to produce a concentrate of acidic compounds and recovery of adipic acid by crystallization from the mixture of oxy compounds. Washing the crude acids with acetone-petroleum ether mixture and recrystallization from methyl ethyl ketone produces adipic acid of good purity (M. P. 149°–51° C.).

There are several distinct advantages inherent in the process of this invention, among the chief of which are the increased conversions obtained and the ease of separation of the products.

It is to be understood that the invention is not limited to the specfic examples, which have been offered merely as illustrations, and that modifications may be made in equipment and conditions within the range specified without departing from the spirit of this invention.

What is claimed is:

1. A method of oxidizing cycloalkanes which comprises subjecting a cyloalkane dissolved in tertiary butyl alcohol, the tertiary butyl alcohol being present in an amount of about 0.1 to 3 parts by weight per part of cycloalkane in the liquid phase and at a temperature in the range of about 100°–200° C. to oxidation by means of an oxygen-containing gas.

2. A process as in claim 1 in which the cycloalkane is cyclohexane.

3. A method of oxidizing cyclohexane to produce adipic acid which comprises the steps of subjecting the cyclohexane dissolved in tertiary butyl alcohol, the tertiary butyl alcohol being present in an amount of about 0.1 to 3 parts by weight per part of cycloalkane in the liquid phase and at a temperature in the range of about 100°–200° C. to oxidation by means of an oxygen-containing gas; distilling off a ternary azeotrope of cyclohexane, tertiary butyl alcohol, and water; separating this azeotropic mixture into an organic cyclohexane layer and an aqueous layer; and recycling the organic layer to the oxidation step.

References Cited in the file of this patent

UNITED STATES PATENTS

| Number | Name | Date |
|---|---|---|
| 2,223,493 | Loder | Dec. 3, 1940 |
| 2,439,513 | Hamblet et al. | Apr. 13, 1948 |
| 2,452,741 | Fleming | Nov. 2, 1948 |
| 2,589,648 | Wadsworth | Mar. 18, 1952 |

OTHER REFERENCES

Wittig et al., Chem. Abst., vol. 35, col. 4359 (1941).